United States Patent

Harte

[15] 3,688,413
[45] Sept. 5, 1972

[54] DISPLAY AND SELECTION APPARATUS FOR VISUAL INSTRUCTION

[72] Inventor: James Richard Harte, 10 W. Concord Ave., Kansas City, Mo. 64112

[22] Filed: Dec. 17, 1970

[21] Appl. No.: 99,052

[52] U.S. Cl. .................................................. 35/9 E
[51] Int. Cl. ............................................... G09b 3/06
[58] Field of Search ........................................ 35/9 E

[56] References Cited

UNITED STATES PATENTS 3,120,708  2/1964  Silber .......................... 35/9 E
2,402,162  6/1946  Holt .......................... 35/9 E X Primary Examiner—Wm. H. Grieb
Attorney—D. A. N. Chase

[57] ABSTRACT

A visual instruction apparatus employing individual frames, each of which has a primary image zone containing a presentation of learning material and/or a question with multiple choice answers, and a row of secondary image zones in which one such secondary zone would be a response for the correct answer, the remaining secondary zones being for notification or instructions for incorrect answers, or for a series of steps in problem solving. The apparatus has a projection system and a viewing screen, and is provided with shutters which normally mask the projected images from the secondary zones. Each shutter may be opened by the student by manual operation of an associated push button corresponding to a particular answer selection. Where score keeping is desired, each frame is also provided with a row of indicator zones associated with respective secondary zones. Each indicator zone is either transparent or opaque depending on whether the corresponding selection is correct or incorrect. If correct, as the corresponding shutter is opened the light projected through the transparent indicator zone is reflected from the rear of the shutter and momentarily redirected to a photocell, causing activation of a right answer counter. Through the use of two rows of indicator zones, incorrect answers may also be separately counted or answers may be scored on a weighted basis.

8 Claims, 10 Drawing Figures

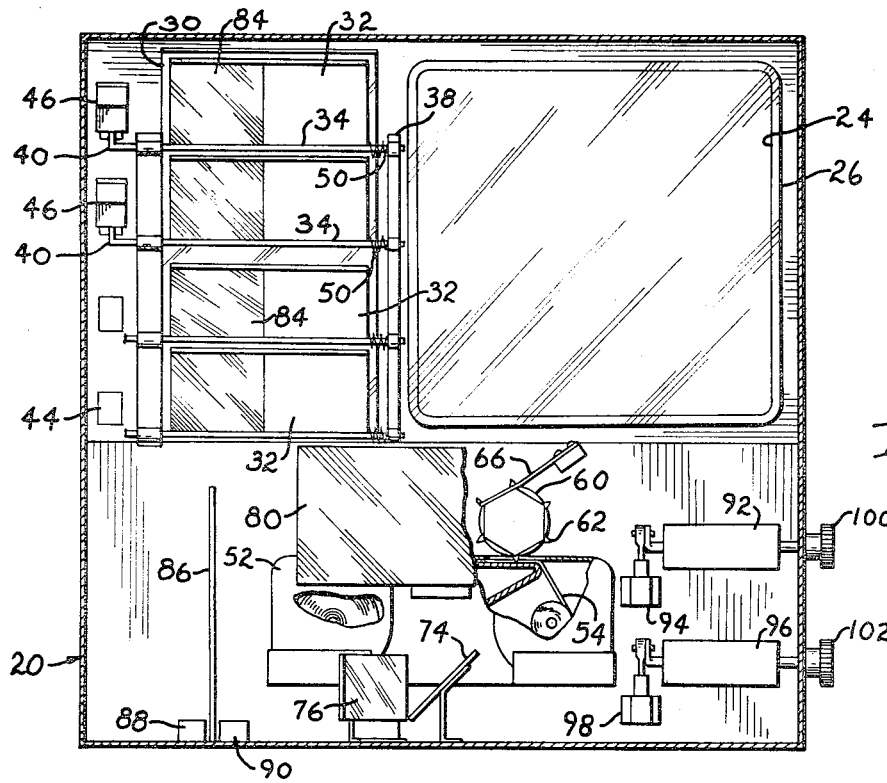
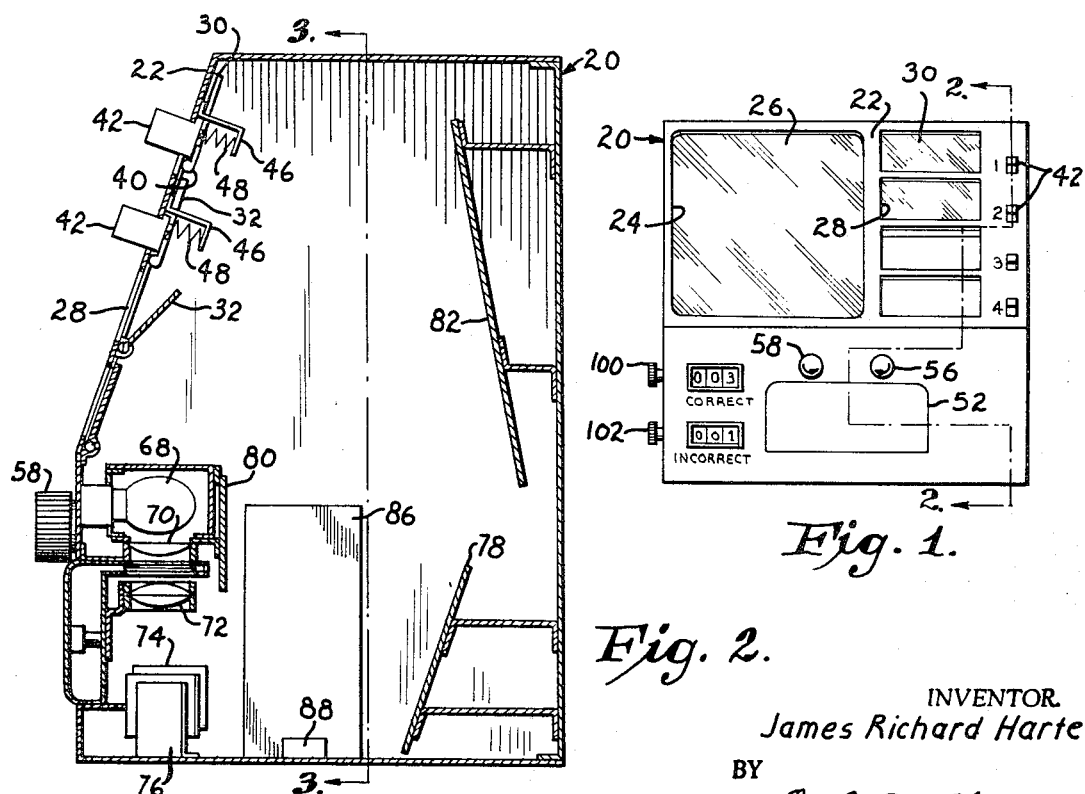
Fig. 3.
Fig. 2.
Fig. 1.
INVENTOR.
James Richard Harte
BY
D. A. N. Chase
ATTORNEY INVENTOR.
James Richard Harte
BY
D. A. N. Chase
ATTORNEY

DISPLAY AND SELECTION APPARATUS FOR VISUAL INSTRUCTION

This invention relates to improvements in visual instruction apparatus and, in particular, to such an apparatus employing multiple shutters selectively operable by a student to reveal secondary instructional information projected from a film frame and relating to primary instructional information presented on the frame.

An important object of the present invention is to provide visual instruction apparatus of relatively uncomplex design capable of presenting various types of learning material including instructions and multiple choice questions, together with corresponding concealed, additional instructions or selectable answers, all on an individual film frame.

Another important object of this invention is to provide an apparatus as aforesaid wherein multiple, selectively operable shutters are employed to normally conceal the secondary instructional material, i.e. additional instructions or answers, so that, upon making a particular selection, additional learning material may be presented to the student besides the usual information as to whether the selection was right or wrong.

Furthermore, another important aim of this invention is to provide apparatus as aforesaid utilizing a film frame which is also provided with a number of indicator zones corresponding to the selectable secondary material, the indicator zones being relatively transparent or opaque for the purpose of scoring the selection made, and wherein each of the shutters upon opening thereof causes light projected through a corresponding, transparent indicator zone to be redirected toward a photocell in order to activate a counter that registers the student's score.

Additionally, it is still another important object of the invention to provide apparatus as aforesaid with score keeping capability including the separate counting of incorrect answers or scoring on a weighted basis.

In the drawings:

FIG. 1 is a front elevational view of a preferred form of the apparatus;

FIG. 2 is an enlarged, cross-sectional view taken along line 2—2 of FIG. 1;

FIG. 3 is a vertical sectional view taken along line 3—3 of FIG. 2 and showing the viewing screen and the shutters as viewed from the rear;

Figure 5:
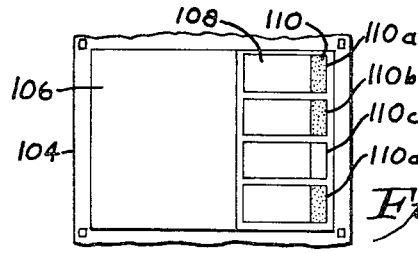
FIGS. 5, 6 and 7 are plan views of three types of film frames utilized in the present invention.

Referring initially to FIGS. 1-3, the housing 20 of the apparatus of the present invention is rectangular except for an inclined, upper front portion 22 which presents a viewing screen. A square opening 24 in the front housing portion 22 permits a student to view a ground glass plate 26 mounted in the housing 20 behind the opening 24 and sealing the latter from the interior of the housing, as best seen in FIG. 3. A row of four, vertically spaced, rectangular openings 28 in the front housing portion 22 are arranged alongside the square opening 24, as is clear in FIG. 1. A ground glass plate 30 within the housing 20 covers the openings 28 and is mounted on the rear of the housing portion 22, thus the two ground glass plates 26 and 30 effectively form the viewing screen of the apparatus as will be appreciated from the continuing description.

The ground glass seen through the opening 24 constitutes the primary viewing area of the screen, while the ground glass seen through the row of smaller openings 28 alongside the primary viewing area constitutes the secondary viewing areas of the screen. However, such secondary viewing areas are normally masked from behind by four vertically spaced shutters 32, each of which is rigid with a horizontal shaft 34 at its lower edge. The opposed ends of the shaft 34 are journalled in bearing mounts 36 and 38, the left end of each shaft 34 (as viewed in FIG. 3) extending from the mount 36 and being provided with an L-shaped extremity 40 that presents a crankarm engageable by the rear of an associated push button 42. Accordingly, four push buttons 42 are provided and extend through corresponding openings 44 in the front housing portion 22 for access by the student.

A generally Z-shaped bracket 46 associated with each of the push buttons 42 serves as a support for a coil spring 48 that is held between the bracket 46 and the rear of the push button 42. As is clear in FIG. 3, the bracket 46 and associated spring 48 serve to limit the inward movement of the associated push button 42, and the spring 48 functions to positively return the push button 42 to the normal position illustrated after the push button is depressed and then released. A return spring 50 for each of the shutters 32 is also provided and is telescoped over the right end of the shutter shaft 34 as seen in FIG. 3.

The apparatus herein is shown as receiving a cassette 52 containing a film strip 54 comprising a series of individual frames, as will be discussed hereinafter. It should be appreciated, however, that other forms of film media may also be employed, as long as provision is made for the sequential positioning of individual frames in the projection system of the apparatus to be subsequently described. A film advance knob 56 and a film reversal knob 58 permit the frames to be sequentially advanced or reversed as appropriate. Each of these knobs operates a sprocket having teeth engageable with the film strip 54, the film reversal sprocket 60 being illustrated in FIG. 3. The sprocket 60 has six pairs of spaced teeth 62, and is provided with six flats 64 to assure positive positioning of the individual frames. Note that a flat spring 66 bears against one of the flats 64 to serve as a stop and thereby provide for such positive positioning in conjunction with each of the flats 64 as the sprocket 60 is incrementally rotated.

Figure 4:
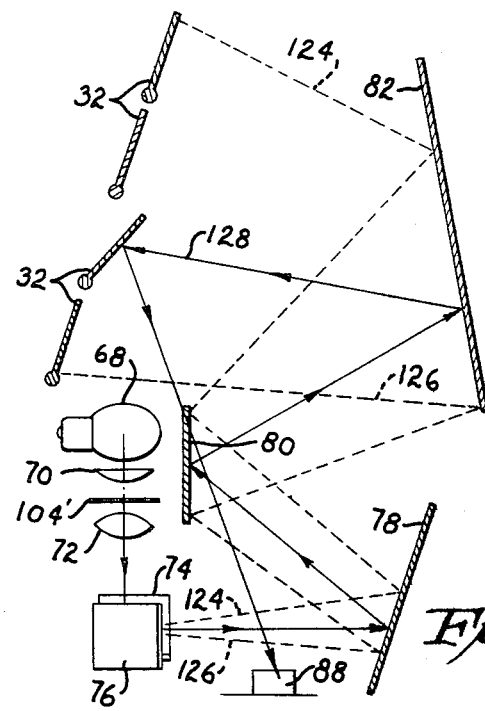
FIG. 4 is a diagrammatic view illustrating the projection system and one of the light paths to a photocell established upon opening movement of one of the shutters.

With reference to FIGS. 2-4, the projection system of the apparatus includes a projection lamp 68, a condensing lens 70, a projection lens 72, and five mirrors 74, 76, 78, 80 and 82. The first mirror 74 is directly beneath the projection lens 72 and is inclined at a 45° angle to direct the image laterally toward the second mirror 76 which is upright but disposed at a 45° angle to direct the image rearwardly toward the third mirror 78. The third mirror 78 has a slight lateral tilt to redirect the image toward the fourth mirror 80 which is centered with respect to the viewing screen. The final mirror 82 then directs the projected image over the full area of the viewing screen including, of course, the ground glass plate 26 and the rear sides of the shutters 32.

Approximately the left one-half of each of the shutters 32 as viewed in FIG. 3 is provided with a reflecting surface 84. As will be discussed hereinafter, these reflecting surfaces 84 on the rear sides of the shutters 32 are provided for the purpose of actuating a counter or counters utilized in applications where score keeping is desired. A partition 86 beneath the shutters 32 is centrally aligned with the reflecting surfaces 84 and serves as a light shield to isolate a pair of photocells 88 and 90 on opposite sides of the partition 86.

A mechanical counter 92 for registering correct answers has a digital display which may be seen from the front of the apparatus as shown in FIG. 1, and is operated by a solenoid 94 that is activated by the photocell 88. A mechanical counter 96 for registering incorrect answers is located below the correct answer counter 92 and is operated by a solenoid 98 that is activated by the photocell 90. Both of the counters 92 and 94 are provided with manual reset knobs 100 and 102 respectively.

Referring to FIG. 5, an individual frame 104 is shown and constitutes an exemplary frame of the film strip 54. The frame 104 has a primary zone 106 and a row of secondary zones 108 corresponding to the primary and secondary areas of the viewing screen. Additionally, for score keeping purposes in connection with multiple choice questions, a row of indicator zones 110 is provided and is associated with the row of secondary zones 108. It should be noted that the indicator zones 110a, 110b and 110d are opaque to indicate that the answers represented by the first, second and fourth selections are incorrect. The indicator zone 110c, however, is transparent and indicates that the third selection is the correct answer.

Figure 8:
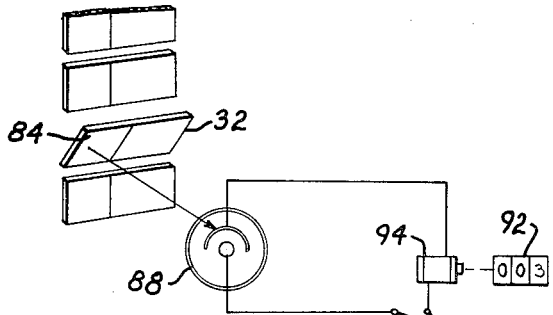
FIG. 8 is a schematic diagram showing the manner in which a single photocell may be actuated by any of the shutters for the purpose of activating a right answer counter.

FIG. 8 illustrates a single photocell system that would be utilized with the frame 104 to register correct answers only. Direct current power is available at the two terminals 112. The third shutter 32 is shown partially opened to a position causing reflected light from its surface 84 to impinge upon the photocell 88, thereby closing the power circuit to the solenoid 94.

Figure 6:
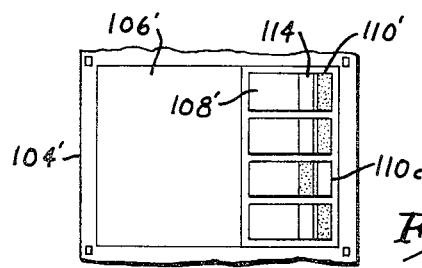
Figure 10:
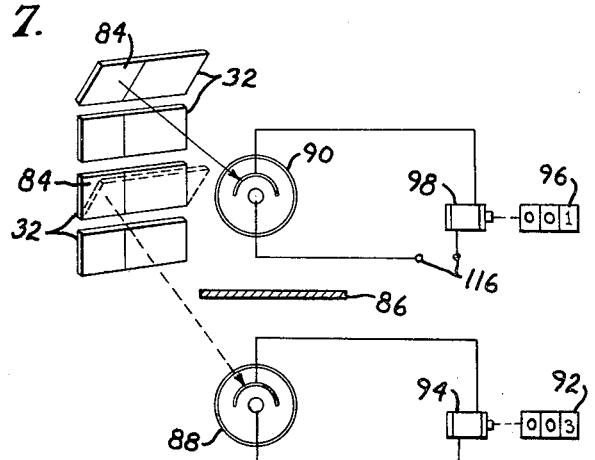
FIG. 10 is a schematic diagram illustrating the operation of a dual counter scoring arrangement as depicted in FIGS. 1-3 where both right and wrong answers are separately counted.

In FIG. 6 a frame 104' is illustrated which is the same in all respects to the frame 104 of FIG. 5 except that an additional row of indicator zones 114 is provided thereon. Accordingly, two parallel pairs of rows of indicator zones 110' and 114 are utilized, the only opaque zone of the row 114 being the zone corresponding to the third selection. Individual frames 104' as illustrated in FIG. 6 would be utilized with the particular embodiment of the apparatus illustrated in FIGS. 1-3 wherein both correct and incorrect answers are separately registered. The control system for this type of score keeping is illustrated in FIG. 10. Again, direct current power is available at the terminals 112 for the correct answer counter and at terminals 116 for the incorrect answer counter.

Figure 9:
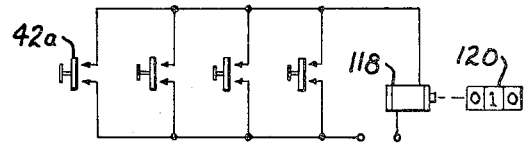
FIG. 9 is a schematic diagram of additional score keeping apparatus that may be provided in the present invention for the purpose of registering the total number of questions answered by the student.

Additionally, if it is also desired to count the total number of questions answered by the student, the modification illustrated in FIG. 9 may be employed. Four, parallel-connected push button switches 42a are utilized and are actuated by the respective push buttons 42 so that, whether the answer is right or wrong, a solenoid 118 is actuated to operate a counter 120. It should be understood that, in any of the score keeping systems utilized with the apparatus, mechanical or electrical interlocks (not shown) would be provided to prevent the student from selecting the same correct answer more than once and to prevent reversing the film or skipping frames in a multiple choice question series.

Figure 7:
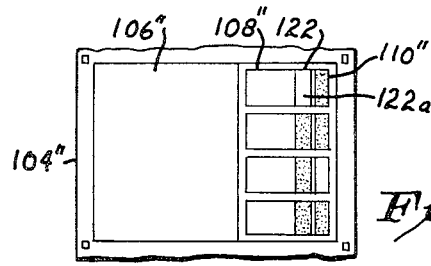

The frame 104'' illustrated in FIG. 7 is similar to frame 104' of FIG. 6 except that the additional row of indicator zones 122 in frame 104'' is for the purpose of keeping score on a weighted basis. The first zone 122a is transparent while the remaining zones are all opaque. Accordingly, recalling that the third selection is correct, the first selection would either be weighted as a partially correct answer entitled to some credit but not as much as the third selection, or weighted as an incorrect answer subject to negative scoring because of its complete inapplicability to the subject matter of the question.

OPERATION

When the apparatus of the present invention is utilized to present multiple choice questions to a student, the question material and choice of answers is projected onto the primary viewing area defined by the ground glass 26 visible through the opening 24. Referring to FIG. 6, for example, the question and answer material is on the primary zone 106' of the frame 104'. In FIG. 4, it may be seen that the image on the frame 104' is projected downwardly onto the first mirror 74, then laterally to the second mirror 76, and finally rearwardly to the third mirror 78. The image has now been rotated 90° by the action of the two 45° oriented mirrors 74 and 76 so that the row of secondary zones 108' and indicator zones 110', 114 will appear as a vertical column aligned with the respective shutters 32. As represented by the broken lines 124 and 126 in FIG. 4, the image diverges as it is transmitted by the mirror system toward the viewing screen in order to cover the entire screen. It should also be appreciated that parallel light paths are established through the row of secondary zones 108' and indicator zones 110' and 114, such light paths being aligned with the row of shutters 32.

In the apparatus illustrated herein, four possible answer choices are provided as represented by the four shutters 32 and corresponding secondary zones 108'. Accordingly, the push buttons 42 are numbered 1, 2, 3 and 4 respectively as may be seen in FIG. 1. The secondary viewing areas of the screen corresponding to the four possible answers are, of course, normally masked from view by the shutters 32. The student makes his answer selection and depresses the appropriate push button 42, thereby opening the shutter 32 corresponding to his answer choice. In so doing, the image on the corresponding secondary zone of the frame 104' becomes visible, and such image informs the student as to whether or not he has selected the correct answer. Additionally, in the event that an incorrect answer was chosen, the student may then receive additional instruction from the material now visible on the screen through the open shutter 32. In this manner, the student may be given instruction of a positive nature even though the wrong answer is initially selected, rather than merely notification that his selection was incorrect.

For instructional programs that do not employ multiple choice questions, the row of secondary zones 108' may be utilized for sequence operations or series steps in a problem with the answer being contained in the fourth or lowermost zone of the row 108'. There are oftentimes instances in the use of instructional aids where the presentation of sequence steps for a solution to a problem, or the presentation of an answer to a single question through a sequence development of such answer, is helpful to the student. This approach has advantages in many courses of instruction such as the physical sciences, business and mathematics where the student would work out the answer to a problem on a piece of paper; check one designated answer area of the screen such as by depressing the fourth push button 42 to determine whether or not the answer is correct; and then if such answer is incorrect, review in sequence the other answer areas corresponding to push buttons Nos. 1 through 3 to observe the proper sequence steps of the solution. The original question and any instructional material included with the question remain in view on the primary area of the screen for ready reference throughout the exercise.

From the foregoing, it may be appreciated that the apparatus of the present invention is quite useful as an instructional aid even without the score keeping feature provided in the embodiment described and illustrated herein. However, when score keeping is desired, the shutters 32 are advantageously employed to actuate the counter systems. Referring again to the frame 104', the third answer selection is the correct answer as indicated by the transparent indicator zone 110c'. As illustrated in FIG. 4, if the student depresses the third push button 42, as the third shutter 32 swings inwardly the light projected through the transparent indicator zone 110c' is momentarily redirected toward the photocell 88, as indicated by the arrows 128. This action is also diagrammatically portrayed in FIG. 10 where the partially open, third shutter 32 is illustrated in broken lines. Note in FIG. 3 that the partition 86 prevents light reflected from the opening shutter 32 from impinging upon the other photocell 90. Accordingly, the photocell 88 is common to the entire row of indicator zones 110' and serves to activate the right answer counter 92 whenever any of the shutters 32 is opened, if such shutter has light impinging upon the left-hand half (as viewed in FIG. 3) of its reflecting surface 84.

In the above example, if any of the other shutters 32 is opened by the student, the photocell 90 receives light reflected from the right-hand half of the reflecting surface 84 of such shutter. This is also diagrammatically depicted in FIG. 10 where it may be seen that the first shutter 32 is shown in a partially open position with light being reflected therefrom toward the photocell 90 in order to activate the incorrect answer counter 96.

With respect to the manner in which the shutters 32 are actuated, a comparison of FIGS. 2 and 3 reveals that, as a particular push button 42 is depressed, the rear of the button 42 pushes against the crankarm formed by the extremity 40 of the shutter shaft to effect swinging of the associated shutter 32 about the axis defined by its shaft 34. The springs 48 and 50 assure that both the push button 42 and the actuated shutter 32 return to their normal positions once the push button 42 is released. If it is also desired that the total number of questions be counted for score keeping purposes, then switches 42a (FIG. 9) may be employed and actuated by the push buttons 42 so that, regardless of the selection made, the counter 120 is actuated.

In regard to the manner of advancing or reversing the film strip 54 illustrated herein, it should be understood that the film advance and reversal knobs 56 and 58 and associated drive sprockets are intended to be purely exemplary, in that other conventional means either manually operated or motor driven could be employed to control the incremental movement of the film frames. Furthermore, it is apparent that other types of film media such as slides or microfilm cards may be readily adapted to the incremental presentation of individual frames, as may be desired by a particular instructional application.

In summary, the instructional apparatus of the present invention has a number of desirable teaching features, including programmed instruction, student participation, immediate feedback to the student, automatic score keeping, and self-pacing. The invention is appropriate for small, compact, self-contained units utilized by a single student, learning at his own pace, but may also be employed advantageously by groups of students in a class instruction environment.

Having thus described the invention, what is claimed as new and desired to be secured by Letters Patent is:

1. Visual instruction apparatus comprising:
   a viewing screen having a primary viewing area and a plurality of secondary viewing areas;
   film media including a number of frames each provided with a primary information bearing zone, a plurality of secondary zones containing information of varying character relating to the information on said primary zone, and a plurality of indicator zones associated with respective secondary zones,
   said indicator zones being relatively transparent or opaque in accordance with the information on said primary zone;
   optical projection means for successively receiving individual frames to direct light onto said zones thereof and project images on said primary and secondary zones toward said primary and secondary viewing areas respectively;
   a plurality of shiftable shutters each normally disposed in blocking relationship to light projected through a corresponding secondary zone and its associated indicator zone;
   a counter having a light responsive activating element common to all of said indicator zones of an individual frame; and selectively operable means associated with said shutters for shifting any one of said shutters to an open position permitting projection of the image on the corresponding secondary zone onto the respective secondary viewing area, and, if the associated indicator zone is transparent, causing light projected therethrough to excite said activating element, whereby the latter responds to light projected through any of said indicator zones when the corresponding shutter is opened.

2. The apparatus as claimed in claim 1, wherein each of said shutters is provided with means directing projected light from a transparent indicator zone intercepted by the shutter toward said activating element as the shutter is opened.

3. The apparatus as claimed in claim 2, wherein said light directing means of each shutter comprises a reflector thereon.

4. The apparatus as claimed in claim 1, wherein said secondary zones of each frame and their associated indicator zones are arranged in a row thereon to provide a corresponding series of spaced, parallel light paths through the row aligned with said shutters.

5. The apparatus as claimed in claim 4, wherein each of said shutters is provided with a reflector thereon in alignment with the portion of the light path from the corresponding indicator zone for redirecting said portion of the light path toward said activating element upon movement of the shutter toward its open position.

6. The apparatus as claimed in claim 1,
each frame being further provided with a second plurality of indicator zones associated with respective secondary zones,
said projection means directing light onto said second plurality of indicator zones of an individual frame when the latter is received by the projection means,
each of said shutters being normally disposed in blocking relationship to light projected through a corresponding indicator zone of said second plurality thereof; and
a second counter having a light responsive activating element common to all of said second plurality of indicator zones of an individual frame,
each shutter upon opening thereof causing light projected through either corresponding indicator zone to excite the respective activating element.

7. The apparatus as claimed in claim 6, wherein the first mentioned plurality of indicator zones and said second plurality of indicator zones are arranged in a substantially parallel pair of rows with corresponding zones of the rows disposed adjacent one another.

8. The apparatus as claimed in claim 1, wherein an additional counter is provided coupled with said selectively operable means and responsive to each operation thereof.

* * * * *